C. B. HUTCHINGS.

Grain Separator.

No. 1,502. Reissued June 23, 1863.

WITNESSES
John Ohm
John R. Crawford

INVENTOR
C. B. Hutchings

N. PETERS, Photo-Lithographer, Washington, D. C.

UNITED STATES PATENT OFFICE.

CHARLES B. HUTCHINGS, OF ROCHESTER, NEW YORK.

IMPROVEMENT IN GRAIN-SEPARATORS.

Specification forming part of Letters Patent No. 30,679, dated November 20, 1860; Reissue No. 1,502, dated June 23, 1863.

*To all whom it may concern:*

Be it known that I, CHARLES B. HUTCHINGS, of Rochester, in the county of Monroe and State of New York, have invented certain new and useful Improvements in Grain-Separators; and I do hereby declare that the following is a full, clear, and exact description thereof, reference being had to the accompanying drawings, making a part of this specification, in which—

Figure 1:
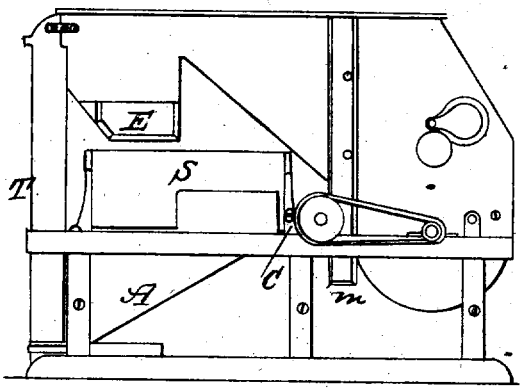
Figure 2:
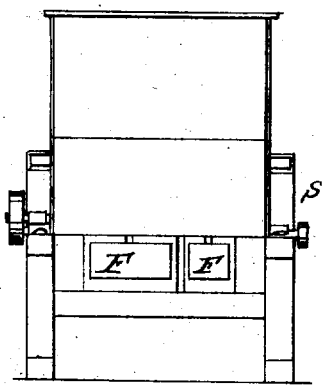
Figure 3:
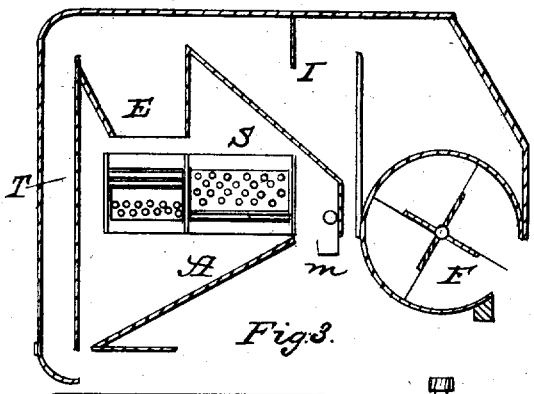
Figure 4:
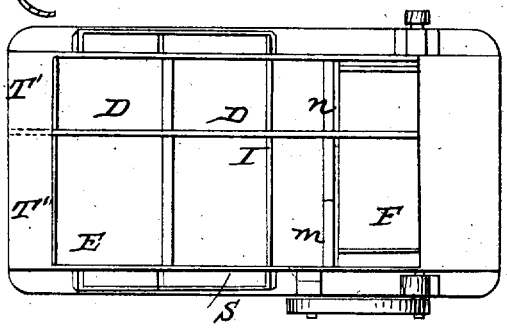
Figure 6:
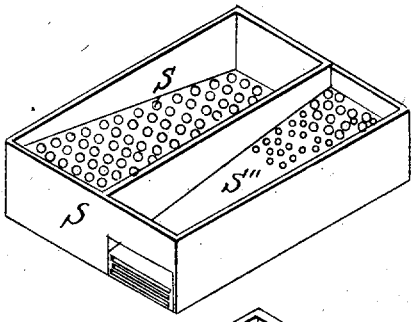
Figure 5:
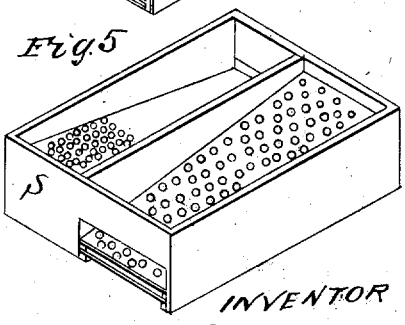

Figure 1 is a side elevation of my machine. Fig. 2 is an elevation of the right-hand end of Fig. 1. Fig. 3 is an elevation similar to Fig. 1, but with the side covering removed. Fig. 4 is a plan of the machine, the top covering being removed. Fig. 5 is an isometrical perspective of the shoe S, containing the riddles $s'$ and screens $s''$. Fig. 6 is a similar view of the opposite side of the same.

Like letters of reference indicate corresponding parts in the several figures.

The nature of this invention will be better understood by reference to the following description of its construction and operation:

A in the drawings represents an equalizing or spreading-board; T, the air or suction tubes; E, the spout through which the screens $s''$ are fed; D, a diaphragm separating the machine vertically into two compartments, and F the fans. There is a strong upward current of air produced by the fans F through the tubes T′ and T″.

The grain may be fed into the machine and upon the coarse riddles $s'$ at the left-hand side of Fig. 2. The grain all falls through these riddles (leaving all the coarse foreign substances to pass off the opposite end) and is conveyed by a chute-board to the opposite side of the diaphragm or partition D, Fig. 4, where it is spread over the surface of the chute-board A, preparatory to being exposed to the action of the strong atmospheric current entering the bottom of the tube T″ from the horizontal section $g$. Here all the heavy, well-filled wheat, whether large or small kernels is carried by its gravity through the current of air, and at once discharged from the machine in a perfectly clean condition, all the light wheat and foreign substances being separated from it by and carried up through the tube T″ with the blast or suction of air. The proportion of grain thus disposed of at this point will depend upon the quality of the mass to be cleaned, and will vary, perhaps, from one, half to seven-eighths of the entire bulk. All the lighter substances—such as shrunken wheat, oats, chess, chaff, and dust—are carried by the current through the tube T″, and the wheat and oats deposited through the spout E upon the screen $s''$, while the other substances enumerated, being lighter, are carried forward and either discharged through the spout $m$ or the fan F.

The screens $s''$ are vibrated by means of a crank, $c$, Fig. 1, and the grain deposited upon them is thoroughly screened, removing all kernels of oats, joints of straw, thistle-heads, and like substances which the suction may have failed to carry forward and deposit in the chamber leading to the spout $m$.

The wheat is discharged through the perforations of the under screen into the smaller compartments, whence it is again subjected to a blast or suction, which should be sufficiently strong to remove all refuse wheat, chess, and similar substances, but not strong enough to carry over the acceptable wheat that reaches this point, which latter therefore falls down and may be mixed with the heavy wheat or kept separated, as desired. The refuse wheat and chess pass up the tube T′ and drop through the spout $n$, Fig. 4.

The action of the current produced by the fans F is similar in both compartments and in both spouts T′ and T″, the density or strength of the current in each being entirely under the control of the operator by means of the regulating-valves B and that to which the rod C is attached, as shown in Fig. 1.

The screens $s''$ should be so punched that the perforations of one will be directly over the blank surface of the one next under it, so that if two are used one-half the area of each should be punched; if three are used one-third (the center section of the middle one) should be punched; if four, one-fourth of each, &c. These screens are designed for separating oats, joints of straw, thistle-heads, and like substances from the wheat, and by having a blank surface below the perforated section of each screen such kernels of oats as may pass through the perforations of one screen, on striking the blank surface of the next endwise fall to a horizontal position, and being longer than the wheat kernels they slide over the punched section of that screen and are discharged from the machine, while the wheat is all screened through.

The riddles $s'$ were designed simply for separating sticks, stones, or other coarse substances from the grain, but when the latter is properly cleaned by the ordinary fanning-mill these riddles may be entirely dispensed with, in which case the area of the fine screen $s''$ may be increased to the full size of the shoe S, Fig. 6, and the grain may be fed into the machine vertically at the top of the tube T, Figs. 1 and 3, instead of at the bottom, by making an opening through the top of the case at that point, where it would be necessary to have the air-inducting section $g$ of the tube arranged to produce a horizontal current of air at that point, the same, (as shown in the drawings,) as at the bottom of the tube, and the effect of the blast upon the descending grain would be the same in either case, and would also be if inducted at any point between the top and bottom. This effect is the separation from the bulk of all the light wheat, oats, chess, and other light substances and delivering the light wheat and oats through the spout E upon the screens $s''$, by means of the blast or current of air, while all the heavier, well-filled wheat is allowed, by virtue of its specific gravity, to drop through the horizontal current and be at once discharged from the machine, without passing through the screens $s''$ at all. The object of this preliminary separation of the light wheat, &c., from the aggregate by the fan F is to relieve the screens $s''$ from the incumbrance of all the first quality of the wheat, which consists generally of at least two-thirds of the entire bulk, and by disposing of such proportion without the use of the screens $s''$ at all, with a separator of a given screening capacity, there may be from two to four times the amount of grain cleaned in a given time that can be by any other machine constructed and operated as heretofore. For instance, if the grinding-mill requires a supply of one hundred and fifty bushels per hour and the separator disposes of one hundred through the blast, which proportion is less than an average, then the machine has but fifty bushels of the mixed grain to dispose of through the screens $s''$, and which will be much more perfectly separated than the whole amount could possibly be in even a longer time if it all had to pass through the said screens $s''$.

What I claim as my invention, and desire to secure by Letters Patent, is—

1. The tubes T′ and T″, screens $s''$, and division D, or their mechanical equivalent, when constructed, arranged, and operated substantially in the manner and for the purposes specified.

2. The relative arrangement of the screens $s''$, the blank surface of one being opposite the perforated section of the one next above it, as specified, so as to catch the kernels of oats or other similiar grain which may pass through the upper screen and strike the blank surface of the next endwise and cause them to fall to a horizontal position, and thereby pass over the perforated section of this screen and be discharged at the side of the machine, while the wheat kernels, being short, pass through the perforations, as and for the purpose described.

C. B. HUTCHINGS.

Witnesses:
JOSEPH QUALTROUGH,
WM. S. LOUGHBOROUGH.